Figure 1:
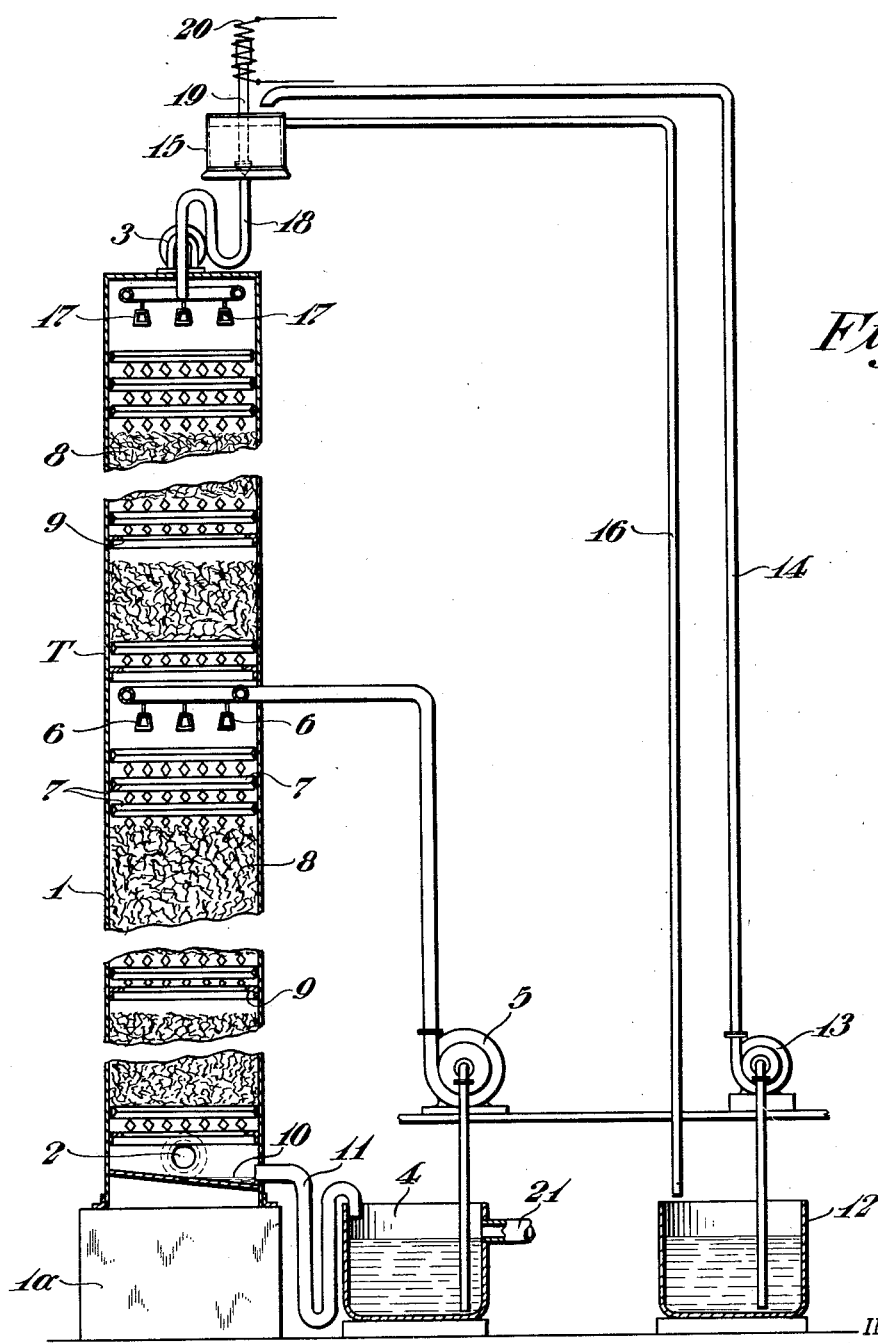

June 9, 1931. F. W. SPERR, JR 1,809,646
APPARATUS FOR TREATING GASES
Original Filed Jan. 29, 1926  2 Sheets-Sheet 1

INVENTOR.
Frederick W. Sperr Jr.
BY
Jesse R. Langley
ATTORNEY

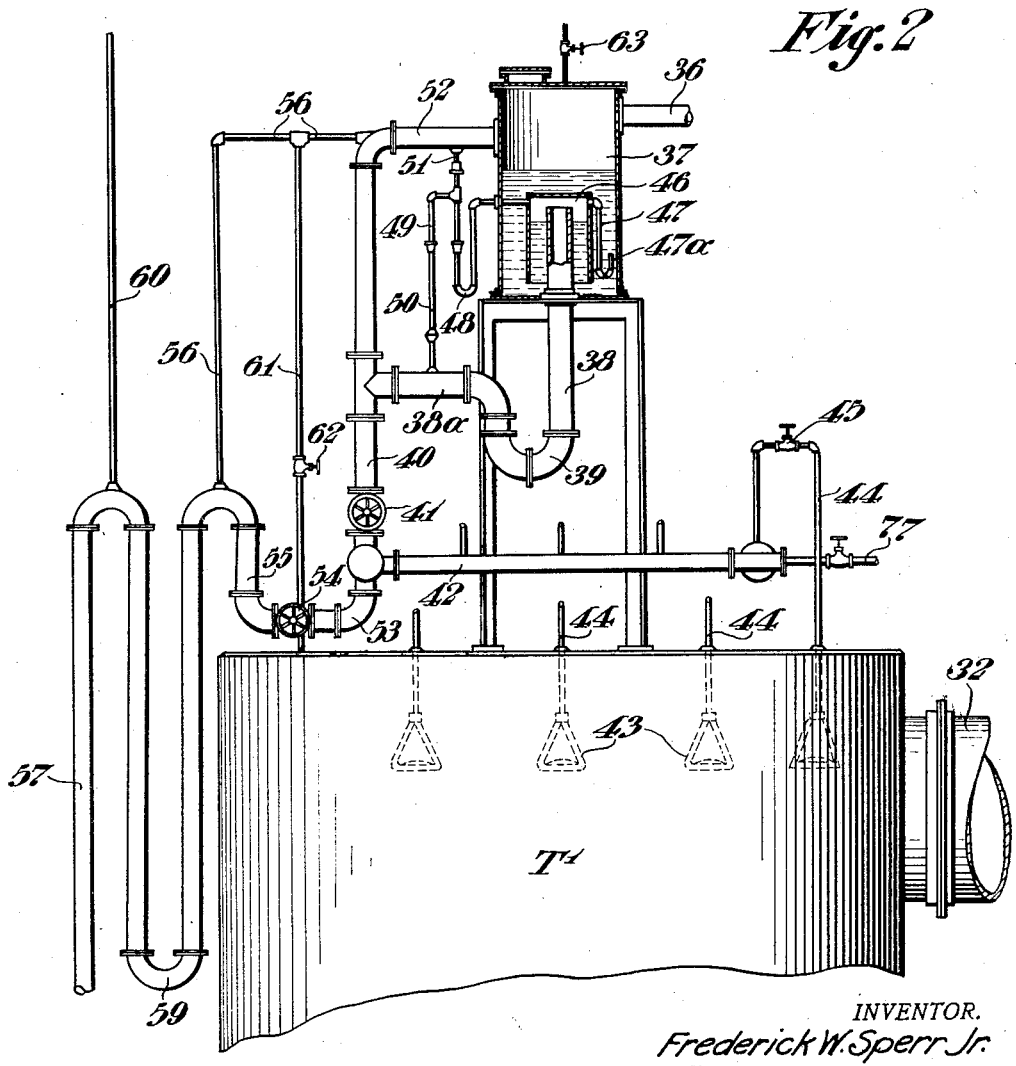

Patented June 9, 1931

1,809,646

UNITED STATES PATENT OFFICE

FREDERICK W. SPERR, JR., OF PITTSBURGH, PENNSYLVANIA, ASSIGNOR TO THE KOPPERS COMPANY, A CORPORATION OF PENNSYLVANIA

APPARATUS FOR TREATING GASES

Original application filed January 29, 1926, Serial No. 84,640. Divided and this application filed October 1, 1927. Serial No. 223,305.

This invention relates to apparatus for treating gases, and is particularly useful for the removal of naphthalene and analogous hydrocarbons from fuel gases, such as coal gas, water gas, coke-oven gas and the like. It will be understood, however, that the invention has many other applications.

The present application is a division of my application Serial No. 84,640, filed Jan. 29, 1926, patented June 24, 1930, No. 1,768,162, which is a continuation-in-part of my application Serial No. 4,686, filed Jan. 26, 1925, patented Mar. 30, 1926, No. 1,578,687. As set forth in that application, it is highly desirable, in the treatment of fuel gas, to scrub the gas in a plurality of stages, using successively purer solvent in the several stages. Preferably, the operation is carried out in a tower through which the gas flows upwardly and a solvent which, for naphthalene removal, is generally an anthracene or petroleum oil, flows downwardly. The tower is divided into two or more stages, the lower stage or stages of the tower embodying a circulating system by which the solvent is continuously circulated. The upper portion of the tower is provided with means for intermittently supplying thereto a quantity of fresh solvent which flows down through the upper portion of the tower and mixes with the circulating solvent, thus keeping the same up to a proper standard of purity.

The tower is filled with a permeable contact material which has a large ratio of area to volume and is effective for retaining the solvent to a certain degree, distributing it over an exceedingly large area, and thereby insuring intimate contact with the solvent of all the gas. I provide as a contact material or filler for the scrubber steel turnings, which I have found are highly desirable for this purpose. These turnings are effective for causing an intimate contact of the gas to the solvent, and masses of this contact material are preferably used in connection with distributing means which spread the solvent over the entire mass of steel turnings.

The distributing means employed are preferably diamond hurdles which are made of wooden staves laid on edge. These staves are supported in the tower at spaced distances and in turn carry the several banks of steel turnings. When mounted in this manner there is no danger of the turnings being crushed together and the staves also act as distributing means which receive the solvent as it drips from the upper banks of the turnings and spread the same uniformly throughout the tower so as to prevent channeling of the solvent through the tower. Other arrangements of distributing means may be employed, such, for instance, as disclosed in my copending application Serial No. 21,980, filed April 9, 1925.

Preferably the liquid is supplied to the tower by means which will insure a high rate of flow over the injection period. When this is done, the nozzles function properly and the desired distribution of liquid across the tower is secured. I have found that a siphoning means is extremely desirable for accomplishing this purpose and in a preferred embodiment of the invention the liquid is first supplied to a reservoir from which it is siphoned to the nozzles. The supply of liquid to the reservoir is controlled by a pump.

I further provide for suitably heating the oil as this is of value in preventing condensation of moisture in the tower. Preferably the heating is carried out at least in part adjacent the nozzles for fresh oil, for example, in the header supplying the nozzles.

In the accompanying drawings which illustrate more or less diagrammatically certain preferred embodiments of the invention:

Figure 1 is a vertical section of a scrubbing tower and associated mechanism embodying the invention; and Fig. 2 is an elevational view parts being shown broken away of the upper part of a scrubbing tower showing a modified form of distributing means.

Similar characters of reference designate similar parts in each of the views of the drawings.

The tower shown in Figure 1 is indicated generally by the reference character T and consists of a shell 1 mounted on a foundation 1ª. This shell is provided with a gas inlet pipe 2 at the bottom and a gas outlet pipe 3 at the top. The operation of the tower will be described with particular reference to the removal of naphthalene from fuel gas, although, as before stated, the tower is applicable to other uses.

The gas to be scrubbed is first subjected to operations wherein tar and ammonia have been removed and the gas has been subjected to the usual treatment of cooling and condensation. The gas reaches the tower through the opening 2 and passes upwardly to the opening 3, from which it is piped away. As the gas passes upwardly it comes in contact with a suitable naphthalene solvent, such as anthracene oil, which solvent is supplied from a tank 4 by a pump 5 supplying spray nozzles 6. These spray nozzles spread the solvent over the tower and as the solvent falls it comes in contact with diamond hurdles 7 which act as distributors and insure uniform distribution of the solvent over the entire cross-sectional area of the tower. The hurdles are made of wooden staves, usually about one inch square, laid in rows as shown. It will be noted that the corner edges of one layer rest on the upper corner edges of the layer immediately therebelow. In making up the banks of diamond hurdles, each may be constructed of from five to ten layers, although when they are used merely as supports for the intermediate banks of steel turnings a smaller number of layers may be used.

The solvent is distributed by the upper bank of diamond hurdles and falls onto a bank of steel turnings 8. These steel turnings are preferably in the form of spirals not exceeding one inch in diameter and not over approximately twelve inches long. It is desirable to limit the depth of each bank of steel turnings to approximately 4 or 5 feet, each bank being supported by a bank of diamond hurdles which, in turn, are carried upon supporting angles 9. In small towers the steel turnings may be depended on to support the diamond hurdles and other banks of turnings thereabove, but in large towers it is desirable, as shown in the drawings, to provide a suitable support 9 for each set of diamond hurdles.

The function of the steel turnings is to distribute the solvent over a very large surface and bring it into intimate contact with the gas. The turnings offer a very high percentage of free space and an unusually low resistance to the passage of the gas, while at the same time they present an enormous surface. They further tend to break up and mix the streams of gas in such a way as to attain a very high efficiency of contact. It will be clear, therefore, that not only is the solvent, in its downward passage, prevented from channeling and covering only a relatively small part of the cross-sectional area of the tower, but the gas, in its upward flow, is also prevented from channeling so that very satisfactory operating conditions are achieved.

For contact purposes, it would be possible to obtain excellent results with steel turnings alone, once good distribution has been achieved, but, as above stated, it is desirable to limit the depth of each bank as otherwise they will tend to pack too closely and offer increased resistance to the flow of gas.

The solvent moves downwardly through the diamond hurdles and the steel turnings until it reaches the bottom of the tower and is collected at 10 from where it passes through a pipe 11 having a trap therein and goes to the tank for recirculation.

The function of the apparatus just described is to reduce the naphthalene content to such a point that the remainder may be removed by small quantities of oil directly applied. The recirculation is conducted at such a rate as to attain even distribution over the entire cross-sectional area of the tower, and in practice this rate might be over 100 gallons per square foot of cross-sectional area per hour. The gas passing upwardly through this portion of the tower has a large portion of the naphthalene removed therefrom and it is desired, in this stage, to reduce the naphthaline content to such a point that a final spray will remove the remainder. Therefore, when the gas passes the spray nozzles 6 it should not contain more than 15 to 30 grains per 100 cubic feet, depending upon the amount of naphthalene originally contained in the gas. If the gas originally supplied to the apparatus contains naphthalene in quantities less than 15 grains per 100 cubic feet the lower absorption stage may be done away with entirely and the last stage of absorption relied on to effect purification of the gas.

The upper portion of the tower is constructed just like the lower portion and consists of alternate banks of diamond hurdles and steel turnings. It is necessary, in this upper stage, to bring the gas into contact with fresh solvent containing no naphthalene or a very small amount thereof so that, for example, the vapor tension of such a solvent with respect to naphthalene will be less than the equivalent of two to three grains of naphthalene per 100 cubic feet of gas. It is always preferable to employ a perfectly fresh solvent, such as kerosene or gas oil which contains no naphthalene at all.

Since the amount of naphthalene to be removed in this stage of scrubbing is very low, the amount of oil required is also very small and the principal problem is to obtain an efficient distribution of this small quantity of oil over the tower filling so that it will come into uniform and intimate contact with a large quantity of gas. In order to accomplish this I inject oil at high rates for short periods of time and provide a permeable contact material, such as the steel turnings above referred to, for holding this solvent in the path of the gas. This principle of operation is set forth and claimed in the copending application of Eugene H. Bird, Serial No. 618,838.

The fresh solvent is supplied from a tank 12 by a pump 13 through a conduit 14 which discharges into a container 15 above the tower T. A return pipe 16 is provided and the rate of pumping is such that there is always a slight return flow, thus insuring the maintenance of a constant level in the container 15. Spray nozzles 17 are provided at the top of the tower and these nozzles are connected to the tank 15 through a conduit 18 having a trap therein. A valve 19 is provided and this is operated at timed intervals in accordance with the amount of solvent it is desired to inject into the apparatus.

The injecting step is preferably accomplished one or more times each hour and it may be readily carried out by supplying current intermittently to an electromagnet 20 adapted to actuate the valve 19. The electromagnet is connected to any desired time controlled switching means, a preferred form of which is described and claimed in the copending application of Alfred R. Powell, Serial No. 10,529, filed February 20, 1925.

When the valve 19 is open oil flows through the conduit 18 to the sprays 17. The oil flows down through the upper bank of diamond hurdles and is uniformly distributed over the tower and then passes through the steel turnings, where intimate contact of the gas and the oil is insured. The oil in the several parts of the tower apparently flows downwardly through the tower at about the same rate of speed so that there is always maintained in the upper portion of the tower a body of oil of substantially uniform depth which is moving downwardly through the tower. There may be one or more of these bodies of oil spaced apart from one another at varying distances, depending upon the time interval between operations of the valve 19. This fresh oil absorbs substantially all of the remaining naphthalene in the gas so that pure gas leaves the outlet 3. The contaminated solvent passes the spray nozzles 6 and mingles with the circulating solvent always up to a desired standard of purity. Fresh solvent is supplied as required to the tank 12 and contaminated solvent is taken off through an overflow 21 in the tank 4.

In the embodiment of the invention illustrated in Figure 2, there is shown a tower $T^1$ which is similar to the tower T of Fig. 1 with the exception of the devices for controlling the oil feed. The tower packings are preferably the same and need not be again described.

In this embodiment of the invention, gas to be treated enters at the bottom of the tower, passes upwardly through the tower and is discharged at 32. Fresh oil is supplied from a pump through a conduit 36, discharging into a closed reservoir 37. The reservoir 37 is provided with an outlet pipe 38 which extends upwardly into the reservoir and is provided with a trap 39. The portion $38^a$ of the conduit lies beyond the trap 39 and discharges into a conduit 40 which is provided with a regulating valve 41 and discharges in a header 42. The various spray nozzles 43 are connected to the header 42 by conduits 44 each provided with a valve 45 whereby the flow of liquid to the several nozzles may be adjusted.

That portion of the conduit 38 which projects into the reservoir 37 is covered with a seal pot 46 provided with a seal 47 and a trap 48. The trap 48 is connected to a vertically adjustable outlet 49 which is connected to the conduit $38^a$ through a conduit 50. Trap 48 is also provided with a vent 51 which terminates in a conduit 52 opening into the upper portion of the reservoir 37. The conduit 52 extends downwardly and terminates in the conduit 40 for which it acts as a vent and serves to equalize pressure conditions through the system.

There is provided a branch or by-pass pipe 53 having a valve 54 therein for taking off a portion of the liquid discharged from the reservoir 37 through the conduit 38. The by-pass 53 has an upstanding portion 55 provided with a vent pipe 56 leading back to the conduit 52 and is also provided with a discharge portion 57. As will be noted from Fig. 2, the conduit 57 discharges at atmospheric pressure and a trap 59 is therefore provided for maintaining suitable pressure conditions in the apparatus. An atmospheric vent 60 is provided for preventing siphoning through the by-pass line.

A vent pipe 61 connects the interior of the tower $T^1$ with the conduit 56 and thence with the reservoir 37. This equalizes the pressure conditions existing in the tower and the reservoir and assures suitable siphoning action. A valve 62 is provided in this conduit whereby it may be shut off if desired. A normally closed relief valve 63 is also provided for the reservoir 37.

It will be noted that the upstanding portion 55 of the by-pass conduit stands at a higher level than the header 42 and also that the conduits 44 leading to the spray nozzles 43 extend upwardly from the header before they are directed downwardly into the tower. This means that there will always be liquid in the header 42 and the pipe 55.

Assuming that the reservoir 37 is substantially empty and that a certain amount of liquid is present in the trap 48 the operation is as follows: The pump is started up and fresh oil is discharged from the conduit 36 into the reservoir 37. The liquid rises inside the seal pot 46 and also outside thereof, pressure conditions under the seal pot being maintained equal to pressure conditions in the reservoir by reason of the free communication afforded through the seal 47 which is then empty. This condition continues until the liquid level reaches the open end 47ª of the seal 47 at which time the seal becomes partly filled with liquid and therefore since liquid is also present in the trap 48 and also in the trap 39, the air under the seal pot is trapped and becomes compressed as the liquid level continues to rise in the reservoir 37.

This continues until there is a sufficient pressure under the seal pot 46 to "blow" the trap 48, at which time the air under the seal pot passes off through the vent 51. The liquid rises rapidly in the seal pot and a siphoning action is set up whereby the liquid is supplied with extreme rapidity to the conduit 40 and thence to the header 42 and the nozzles 43. This principle of operation is shown in the patent to Chase No. 1,078,995. The siphoning operation continues until the liquid level falls to a point below the opening 47ª, at which time the seal 47 is sucked empty of liquid, and air enters the seal pot 46, breaking the siphon. Of course during the siphoning operation the trap 48 has again become filled with liquid so that the apparatus is again in condition for operation upon liquid being supplied in suitable quantity to the reservoir 37.

The siphoning apparatus above described is very effective, but it is difficult to make or maintain in suitable operating condition a siphon for operation on small quantities of liquid. The siphoning apparatus, in order to meet the operating requirements, will generally be effective for discharging 20 gallons of oil or upwards at each operation, although it is frequently desired to use considerably smaller quantities of liquid. For example, in winter operation of one tower constructed according to this invention, a "shot" of 10 gallons was desired. Also the amount of oil to be shot at one operation of the siphon may be varied from time to time in accordance with several conditions. The provision of the valve 54 and the by-pass 53 gives the apparatus the desired flexibility of operation. By suitably regulating the valve 54 the liquid supplied from the reservoir 37 by the siphoning apparatus may be divided in any desired proportion, within limits, to the nozzles 43 and the discharge conduit 57. Therefore it is very easy to divide a discharge of 20 gallons from the reservoir into say 10 gallons to the nozzles and 10 gallons to the discharge conduit 57.

In order to prevent condensation of moisture from the gas being treated in the upper part of the tower, it is often desirable to heat the fresh oil for this purpose. Steam heating coils are provided in the fresh oil sump but due to the fact that the header 42 remains full of oil between successive shots of the siphon, which shots may be an hour or so apart, I also provide for heating means in the header itself. I therefore provide a steam line 77 which runs through the header 42 and maintains the liquid therein at the desired temperature.

I have illustrated and described certain preferred embodiments of my invention, but it will be understood that the invention is not limited to the forms shown as it may be otherwise embodied within the scope of the following claim.

I claim as my invention:

Apparatus for treating a gas with a liquid which comprises a tower containing alternately disposed strata of distributive units and permeable contact masses, the distributive units being comprised of superimposed layers of bars of quadrulateral cross section having the bars in one layer contacting with the bars in another layer at their angular edges and at an angle with the bars in other layers of the same unit.

In testimony whereof, I have hereunto subscribed my name this 30th day of September, 1927.

FREDERICK W. SPERR, Jr.